(12) United States Patent
Ishihara

(10) Patent No.: US 9,377,118 B2
(45) Date of Patent: Jun. 28, 2016

(54) PRESSURE REDUCING VALVE

(71) Applicant: KEIHIN CORPORATION, Shinjuku-Ku, Tokyo (JP)

(72) Inventor: Kei Ishihara, Tochigi (JP)

(73) Assignee: Keihin Corporation, Tokyo (JP)

( * ) Notice: Subject to any disclaimer, the term of this patent is extended or adjusted under 35 U.S.C. 154(b) by 22 days.

(21) Appl. No.: 14/410,290

(22) PCT Filed: Jun. 21, 2013

(86) PCT No.: PCT/JP2013/067097
§ 371 (c)(1),
(2) Date: Dec. 22, 2014

(87) PCT Pub. No.: WO2014/007080
PCT Pub. Date: Jan. 9, 2014

(65) Prior Publication Data
US 2015/0285393 A1 Oct. 8, 2015

(30) Foreign Application Priority Data

Jul. 2, 2012 (JP) ................................ 2012-148923

(51) Int. Cl.
*F16K 31/12* (2006.01)
*F16K 17/30* (2006.01)
(Continued)

(52) U.S. Cl.
CPC ............... *F16K 17/30* (2013.01); *F02M 21/02* (2013.01); *F02M 21/0233* (2013.01); *F02M 37/00* (2013.01); *G05D 16/06* (2013.01); *G05D 16/0661* (2013.01); *Y02T 10/32* (2013.01); *Y10T137/777* (2015.04); *Y10T 137/7793* (2015.04); *Y10T 137/782* (2015.04)

(58) Field of Classification Search
CPC ............ Y10T 137/783; Y10T 137/782; Y10T 137/7809; Y10T 137/7801; Y10T 137/7793
USPC .................................. 251/28, 77, 61.5, 62.2
See application file for complete search history.

(56) References Cited

U.S. PATENT DOCUMENTS 3,075,545 A * 1/1963 Eichelman ............ A61M 16/10
137/505.18
5,358,004 A * 10/1994 Atkinson ........... G05D 16/0663
137/505.18

(Continued)

FOREIGN PATENT DOCUMENTS

JP S49-143839 U 12/1974
JP S52-42323 U 3/1977

(Continued)

*Primary Examiner* — R. K. Arundale
(74) *Attorney, Agent, or Firm* — Carrier Blackman & Associates, P.C.; Joseph P. Carrier; William D. Blackman

(57) ABSTRACT

In a pressure reducing valve, a linking mechanism for linking a valve shaft of a pressure reducing valve body and a diaphragm rod is formed from a bottomed linking hole provided in the diaphragm rod, a decreased diameter shaft portion provided on the valve shaft, first and second increased diameter shaft portions disposed on the decreased diameter shaft portion, a retaining plate fitted into the linking hole and has a latching recess portion, and a latching ring that engages with a first latching groove provided on the retaining plate and a second latching groove provided on the linking hole, the latching ring being capable of increasing in diameter along a radial direction of the valve shaft, and a set spring is provided in a compressed state in the linking hole, the set spring urging the retaining plate toward the side on which the pressure reducing valve body is opened.

6 Claims, 4 Drawing Sheets

(51) Int. Cl.
*F02M 37/00* (2006.01)
*G05D 16/06* (2006.01)
*F02M 21/02* (2006.01)

(56) References Cited

U.S. PATENT DOCUMENTS

| | | | |
|---|---|---|---|
| 8,714,178 B2 | 5/2014 | Yamamoto | |
| 2002/0083980 A1* | 7/2002 | Nakajima | G05D 16/0663 137/505.41 |
| 2009/0320935 A1* | 12/2009 | Yamamoto | G05D 16/0663 137/505.39 |
| 2011/0272614 A1* | 11/2011 | Yamamoto | F02M 21/0236 251/321 |
| 2011/0277854 A1 | 11/2011 | Yamamoto | |

FOREIGN PATENT DOCUMENTS

| | | |
|---|---|---|
| JP | 2010-176643 A | 8/2010 |
| JP | 2011-076424 A | 4/2011 |
| JP | 2011-158052 A | 8/2011 |

* cited by examiner

PRESSURE REDUCING VALVE

TECHNICAL FIELD

The present invention relates to a pressure reducing valve that includes a valve seat member that has a valve hole providing communication between a high pressure chamber and a pressure reducing chamber, a pressure reducing valve body that opens and closes the valve hole in cooperation with the valve seat member, a diaphragm rod that is linked via a linking mechanism to a valve shaft connectedly provided at one end of the pressure reducing valve body, and a diaphragm that is joined to the diaphragm rod and disposed so as to provide a partition between a control pressure chamber and a pressure action chamber, the pressure action chamber being made to communicate with the pressure reducing chamber, the diaphragm pulling the valve shaft so as to seat the pressure reducing valve body on the valve seat member when shifting to the control pressure chamber side, and the diaphragm pushing the valve shaft so as to separate the pressure reducing valve body from the valve seat member when shifting to the pressure action chamber side, and, in particular, to an improvement of an arrangement in which the linking mechanism is formed from a bottomed linking hole that is provided in the diaphragm rod and opens on the valve seat member side, a decreased diameter shaft portion provided on the valve shaft and a pair of increased diameter shaft portions having a larger diameter than that of the decreased diameter shaft portion on opposite sides in the axial direction of the decreased diameter shaft portion, a retaining plate that is fitted into the linking hole and has a latching recess portion opening on one side and having a width that is larger than the external diameter of the decreased diameter shaft portion and smaller than the external diameter of the two increased diameter shaft portions, the decreased diameter shaft portion being loosely inserted into the latching recess portion, and a latching ring that engages with an arc-shaped first latching groove provided on an outer peripheral face of the retaining plate and an annular second latching groove provided on the inner periphery of the linking hole so as to correspond to the first latching groove, the latching ring being capable of increasing in diameter along the radial direction of the valve shaft.

BACKGROUND ART

Such a pressure reducing valve is already known, as disclosed in Patent Document 1 below.

RELATED ART DOCUMENTS

Patent Documents

Patent Document 1: Japanese Patent Application Laid-open No. 2011-76424

SUMMARY OF THE INVENTION

Problems to be Solved by the Invention

With regard to the linking mechanism in such a pressure reducing valve, the retaining plate and the latching ring can easily be fitted into a fitting hole for the diaphragm rod by pushing the retaining plate in the axial direction, and the ease of assembly is good; moreover, the manufacturing tolerance for coaxial precision between the valve shaft and the diaphragm rod can be absorbed by clearance present between the decreased diameter shaft portion of the valve shaft and the latching recess portion of the retaining plate, and the seating attitude of the pressure reducing valve body with respect to the valve seat member can be properly maintained.

However, a minute clearance is present around the latching ring, this being necessary for mounting the latching ring, and this causes rattling between the retaining plate and the diaphragm rod to thus allow relative movement in the axial direction. In the arrangement of Patent Document 1 above, the pressure reducing valve body is urged toward the diaphragm rod side by means of a set spring, disposed on the reverse side opposite to the valve shaft, of the pressure reducing valve body, thus making the tip of the valve shaft abut against a bottom wall of the fitting hole of the diaphragm rod and thereby eliminating the rattling.

However, in the arrangement above, since the set spring urges the pressure reducing valve body toward the valve-closing side, after the pressure reducing valve body is seated on a valve seat member by virtue of the pull of a diaphragm, the pull of the diaphragm advances by a portion corresponding to the minute clearance, and rattling occurs between the tip of the valve shaft and the bottom wall of the fitting hole of the diaphragm rod. Because of this, when the diaphragm subsequently shifts to a pushing operation so as to separate the pressure reducing valve body from the valve seat member, the rattling is blocked, and the tip of the valve shaft abuts against the bottom wall of the fitting hole of the diaphragm rod with an impact, thus generating an abnormal noise in some cases. Furthermore, this causes a delay in the response of the pressure reducing valve body to movement of the diaphragm, thus affecting the pressure regulating performance.

The present invention has been accomplished in light of such circumstances, and it is an object thereof to provide a pressure reducing valve of the above type that can prevent an abnormal noise from being generated by rattling in a linking part between a diaphragm rod and a valve shaft when opening and closing a pressure reducing valve body, that is silent, and that has excellent pressure regulating performance.

Means for Solving the Problems

In order to attain the above object, according to a first aspect of the present invention, there is provided a pressure reducing valve comprising a valve seat member that has a valve hole providing communication between a high pressure chamber and a pressure reducing chamber, a pressure reducing valve body that opens and closes the valve hole in cooperation with the valve seat member, a diaphragm rod that is linked via a linking mechanism to a valve shaft connectedly provided at one end of the pressure reducing valve body, and a diaphragm that is joined to the diaphragm rod and disposed so as to provide a partition between a control pressure chamber and a pressure action chamber, the pressure action chamber being made to communicate with the pressure reducing chamber, the diaphragm pulling the valve shaft so as to seat the pressure reducing valve body on the valve seat member when shifting to the control pressure chamber side, the diaphragm pushing the valve shaft so as to separate the pressure reducing valve body from the valve seat member when shifting to the pressure action chamber side, the linking mechanism being formed from a bottomed linking hole that is provided in the diaphragm rod and opens on the valve seat member side, a decreased diameter shaft portion provided on the valve shaft and first and second increased diameter shaft portions disposed on opposite sides in the axial direction of the decreased diameter shaft portion and having a larger diameter than that of the decreased diameter shaft portion, a retaining plate that is fitted into the linking hole and has a latching recess portion opening on one side and having a width that is larger than an external diameter of the decreased diameter shaft portion and smaller than an external diameter of the two increased diameter shaft portions, the decreased diameter shaft portion being loosely inserted into the latching recess portion, and a latching ring that engages with an arc-shaped first latching groove provided on an outer peripheral face of the retaining plate and an annular second latching groove provided on an inner periphery of the linking hole so as to correspond to the first latching groove, the latching ring being capable of increasing in diameter along a radial direction of the valve shaft, characterized in that a set spring is provided in a compressed state in the linking hole, the set spring urging the retaining plate toward the side on which the pressure reducing valve body is opened.

Further, according to a second aspect of the present invention, there is provided a pressure reducing valve comprising a valve seat member that has a valve hole providing communication between a high pressure chamber and a pressure reducing chamber, a pressure reducing valve body that opens and closes the valve hole in cooperation with the valve seat member, a diaphragm rod that is linked via a linking mechanism to a valve shaft connectedly provided integrally at one end of the pressure reducing valve body, and a diaphragm that is joined to the diaphragm rod and disposed so as to provide a partition between a control pressure chamber and a pressure action chamber, the pressure action chamber being made to communicate with the pressure reducing chamber, the diaphragm dragging the valve shaft so as to seat the pressure reducing valve body on the valve seat member when shifting to the control pressure chamber side, the diaphragm pushing the valve shaft so as to separate the pressure reducing valve body from the valve seat member when shifting to the pressure action chamber side, the linking mechanism being formed from a bottomed linking hole that is provided in the diaphragm rod and opens on the valve seat member side, a decreased diameter shaft portion provided on the valve shaft and first and second increased diameter shaft portions disposed on opposite sides in an axial direction of the decreased diameter shaft portion and having a larger diameter than that of the decreased diameter shaft portion, a retaining plate that is fitted into the linking hole and has a latching recess portion opening on one side and having a width that is larger than an external diameter of the decreased diameter shaft portion and smaller than an external diameter of the two increased diameter shaft portions, the decreased diameter shaft portion being loosely inserted into the latching recess portion, and a latching ring that engages with an arc-shaped first latching groove provided on an outer peripheral face of the retaining plate and an annular second latching groove provided on an inner periphery of the linking hole so as to correspond to the first latching groove, the latching ring being capable of increasing in diameter along a radial direction of the valve shaft, characterized in that a set spring is provided in a compressed state in the linking hole, the set spring urging the valve shaft toward the side on which the pressure reducing valve body is opened.

Furthermore, according to a third aspect of the present invention, in addition to the first or second aspect, one of mutually abutting end faces of the retaining plate and the second increased diameter shaft portion, on the diaphragm rod side, of the valve shaft is formed into a convex spherical face and the other end face is formed into a concave tapered face.

Moreover, according to a fourth aspect of the present invention, in addition to the first or second aspect, the linking hole is formed from a spring seat hole that receives and positions an end part of the set spring, a fitting hole that has a larger diameter than that of the spring seat hole and is disposed coaxially therewith, the retaining plate being fitted into the fitting hole, and a spring guide hole that has a tapered shape so as to provide a connection between the spring seat hole and the fitting hole and guides the set spring from the fitting hole to the spring seat hole.

Effects of the Invention

In accordance with the first aspect of the present invention, since the set spring urging the retaining plate toward the valve-opening side of the pressure reducing valve body is provided in a compressed state in the linking hole, a state in which the inside face, on the set spring side, of the first latching groove of the retaining plate and the latching ring abut against each other and a state in which the latching ring and the inside face, on the pressure reducing valve body side, of the second latching groove of the diaphragm rod abut against each other can be maintained and, therefore, even when the pressure reducing valve body is opened and closed by pushing and pulling the diaphragm rod relative to the valve shaft, the state of abutment can be maintained, and it is possible to prevent the occurrence of an abnormal noise due to the phenomenon of repeated detachment and abutment of the abutment part, thus giving a silent pressure reducing valve. Moreover, since there is no delay in response of the pressure reducing valve body to movement of the diaphragm, it can also contribute to improvement of the pressure regulating performance.

In accordance with the second aspect of the present invention, since the set spring urging the retaining plate toward the valve-opening side of the pressure reducing valve body via the valve shaft is provided in a compressed state in the linking hole, opposing faces of the retaining plate and the second increased diameter shaft portion on the diaphragm rod side of the valve shaft can be always maintained in an abutting state; moreover, the latching ring and the inside face, on the set spring side, of the first latching groove of the retaining plate, and the latching ring and the inside face, on the pressure reducing valve body side, of the second latching groove of the diaphragm rod are always maintained in an abutting state, and it is possible to further reliably prevent the occurrence of an abnormal noise due to rattling in the linking mechanism regardless of whether the diaphragm rod is pushed or pulled, thereby ensuring a yet more silent pressure reducing valve.

In accordance with the third aspect of the present invention, since one of the mutually abutting end faces of the retaining plate and the second increased diameter shaft portion, on the diaphragm rod side, of the valve shaft is formed into a convex spherical face and the other end face is formed into a concave tapered face, in a state in which the pressure reducing valve body closes the valve, due to a swiveling operation of the spherical face and the tapered face abutting against each other, any tilt of the diaphragm rod relative to the valve shaft can also be absorbed, thus ensuring an appropriate valve-closing attitude of the valve body.

In accordance with the fourth aspect of the present invention, since the linking hole is formed from the spring seat hole that receives and positions an end part of the set spring, the fitting hole that has a larger diameter than that of the spring seat hole and is disposed coaxially therewith, the retaining plate being fitted into the fitting hole, and the spring guide hole that has a tapered shape so as to provide a connection between the spring seat hole and the fitting hole and guides the set spring from the fitting hole to the spring seat hole, it is possible, by merely dropping the set spring into the linking hole of the diaphragm rod, for the spring seat hole to automatically accept and position the set spring, thus assuring ease of assembly.

EXPLANATION OF REFERENCE NUMERALS AND SYMBOLS

Figure 1:
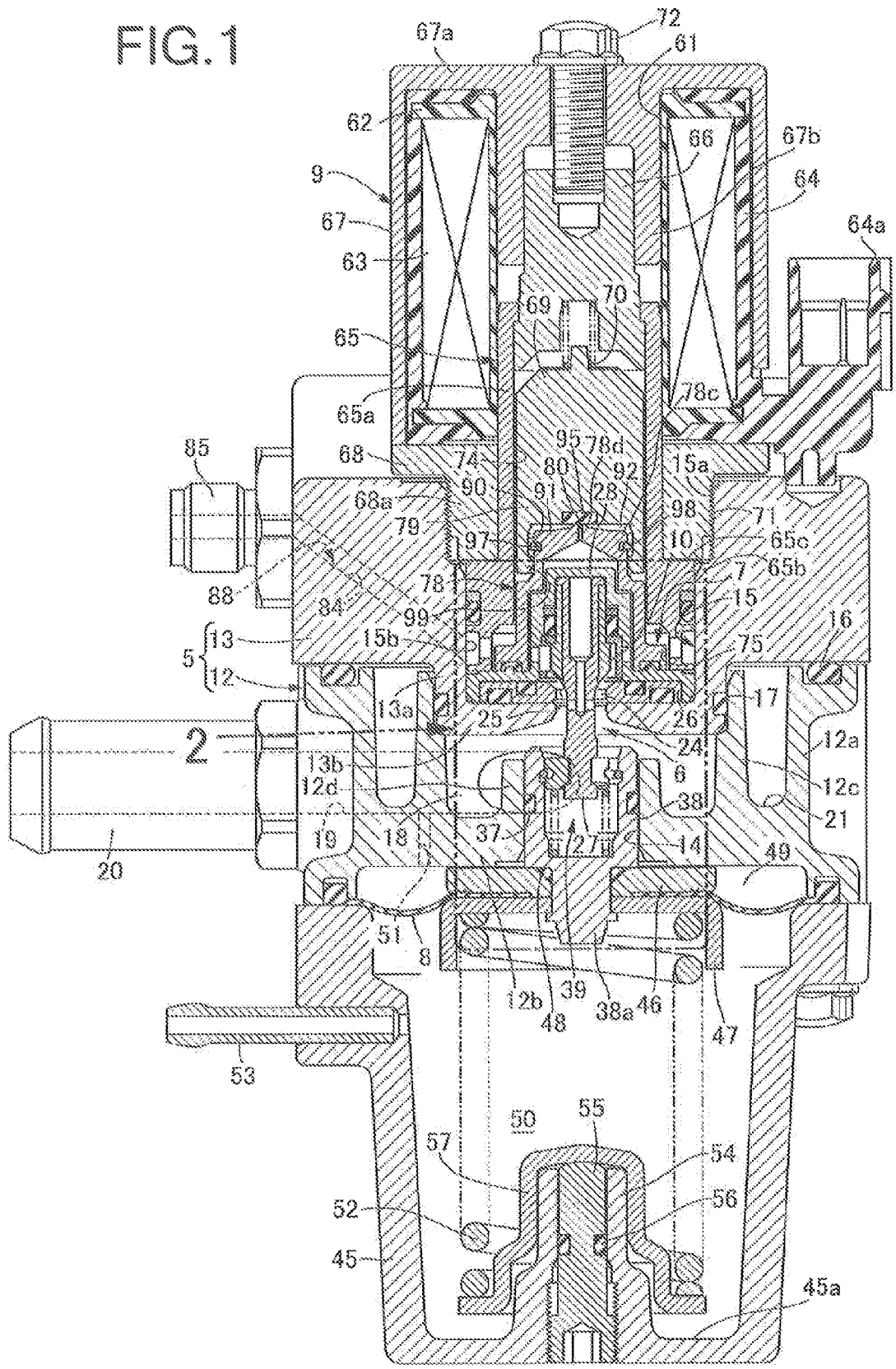
FIG. 1 is a vertical sectional view of a pressure reducing apparatus in a state in which a pressure reducing valve is opened and a cutoff valve is closed, illustrating a first embodiment of the present invention. (first embodiment)

6 Pressure reducing valve
8 Diaphragm
10 Pressure reducing valve body
18 Pressure reducing chamber
24 Valve hole
26 Valve seat member
27 Valve shaft
27a Decreased diameter shaft portion
27b First increased diameter shaft portion
27c Second increased diameter shaft portion
31 High pressure chamber (valve chamber)
38 Diaphragm rod
39 Linking mechanism
40 Linking hole
40a Spring seat hole
40b Spring guide hole
40c Fitting hole
40d Ring guide hole
41 Retaining plate
41a Latching recess portion
42 First latching groove
43 Second latching groove
44 Latching ring
49 Pressure action chamber
50 Control pressure chamber
58 Set spring
59 Spherical face
60 Tapered face

MODES FOR CARRYING OUT THE INVENTION

A first embodiment of the present invention is now explained by reference to the attached FIG. 1 to FIG. 3.
First Embodiment First, in FIG. 1, this pressure reducing apparatus is mounted in for example an engine compartment of a gaseous fuel vehicle in order to reduce the pressure of a high pressure natural gas fuel and supply it to an engine (not illustrated), and is formed by disposing on a body 5 a pressure reducing valve 6 having a pressure reducing valve body 10 linked to a diaphragm 8 as a pressure receiving member, and a cutoff valve 7 having a cutoff valve body 78 driven by a solenoid 9.

The body 5 is formed by joining to each other a first body member 12 and a second body member 13 disposed above the first body member 12. The first body member 12 integrally has a vertically extending outer tube portion 12a, a first inwardly-facing collar portion 12b protruding radially inwardly from a lower part of the outer tube portion 12a, an inner tube portion 12c extending upwardly from an intermediate part of the first inwardly-facing collar portion 12b while being coaxial with the outer tube portion 12a, and a short tube portion 12d extending slightly upwardly from the inner periphery of the first inwardly-facing collar portion 12b while being coaxial with the inner tube portion 12c, and a sliding support hole 14 having a circular cross section is formed in a central part of the first inwardly-facing collar portion 12b and the short tube portion 12d, the sliding support hole 14 being coaxial with the outer tube portion 12a and the inner tube portion 12c.

Furthermore, the second body member 13 integrally has a fitting tube portion 13a fitted into an end part, on the second body member 13 side, of the inner tube portion 12c, and a housing hole 15 is provided in the second body member 13, part of the housing hole 15 being formed within the fitting tube portion 13a. Furthermore, a second inwardly-facing collar portion 13b extruding radially inwardly from an end part, on the diaphragm 8 side, of the housing hole 15, that is, the tip of the fitting tube portion 13a, is provided integrally with the second body member 13. Moreover, the housing hole 15 is formed by coaxially connectedly providing a threaded hole portion 15a opening on the side opposite to the diaphragm 8, and a fitting hole portion 15b having a smaller diameter than that of the threaded hole portion 15a and disposed on the second inwardly-facing collar portion 13b side.

An annular first seal member 16 is disposed between the outer tube portion 12a of the first body member 12 and the second body 5, and an annular second seal member 17 is disposed between the inner tube portion 12c and the fitting tube portion 13a of the second body member 13 fitted into the inner tube portion 12c of the first body member 12. A pressure reducing chamber 18 is formed between the first and second body members 12 and 13 so that the outer periphery is defined by the inner tube portion 12c of the first body member 12, and an outlet passage 19 communicating with the pressure reducing chamber 18 is connected to a connecting tube 20 projecting from a side face of the first body member 12. Furthermore, an annular passage 21 is formed between the first and second body members 12 and 13, the outer periphery and the inner periphery of the annular passage 21 being defined by the outer tube portion 12a and the inner tube portion 12c of the first body member 12, and a heating medium such as hot water for heating the interior of the pressure reducing chamber 18 flows through the interior of the annular passage 21.

Figure 2:
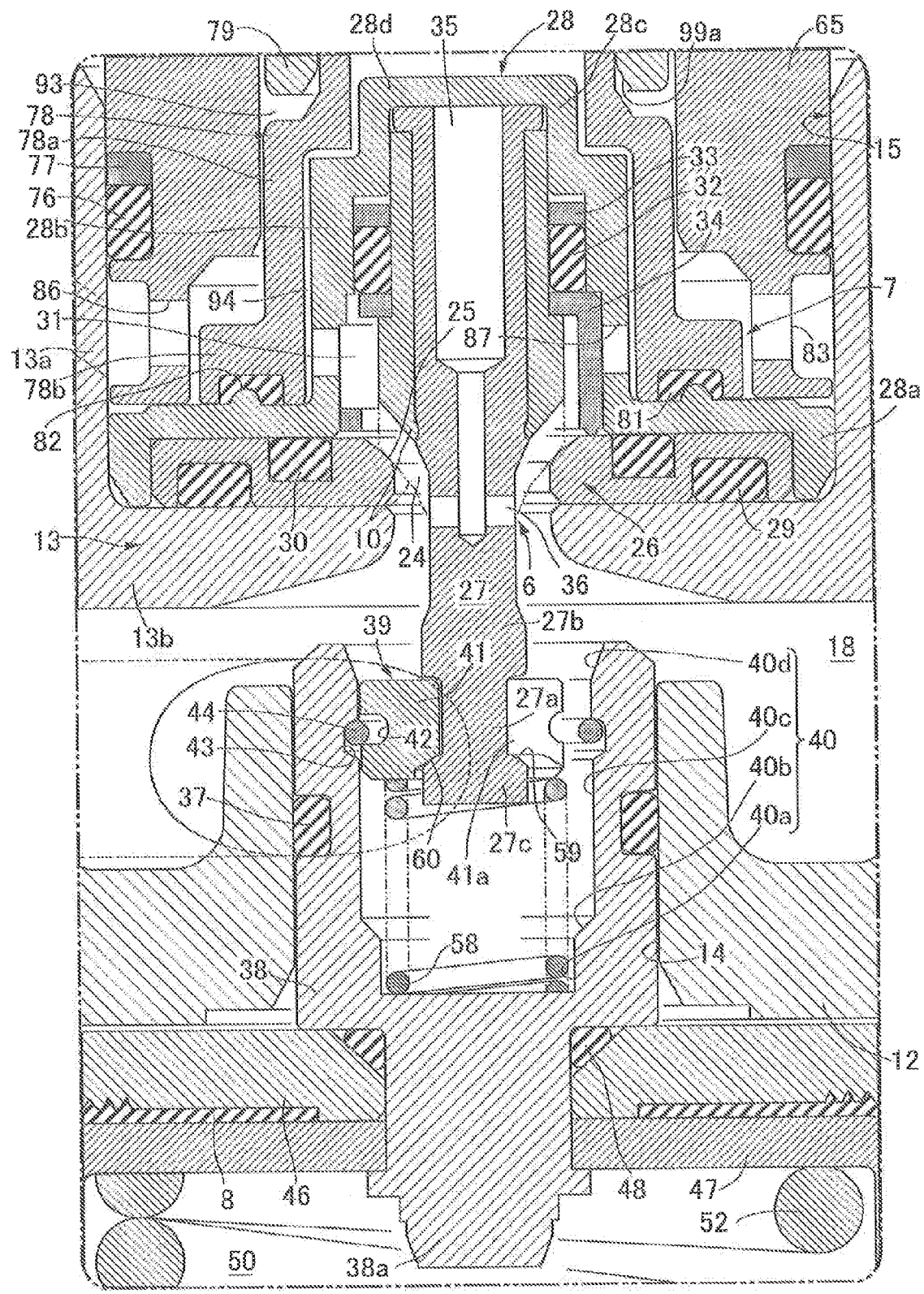
FIG. 2 is an enlarged view of a part shown by arrow 2 in FIG. 1. (first embodiment)
Figure 3:
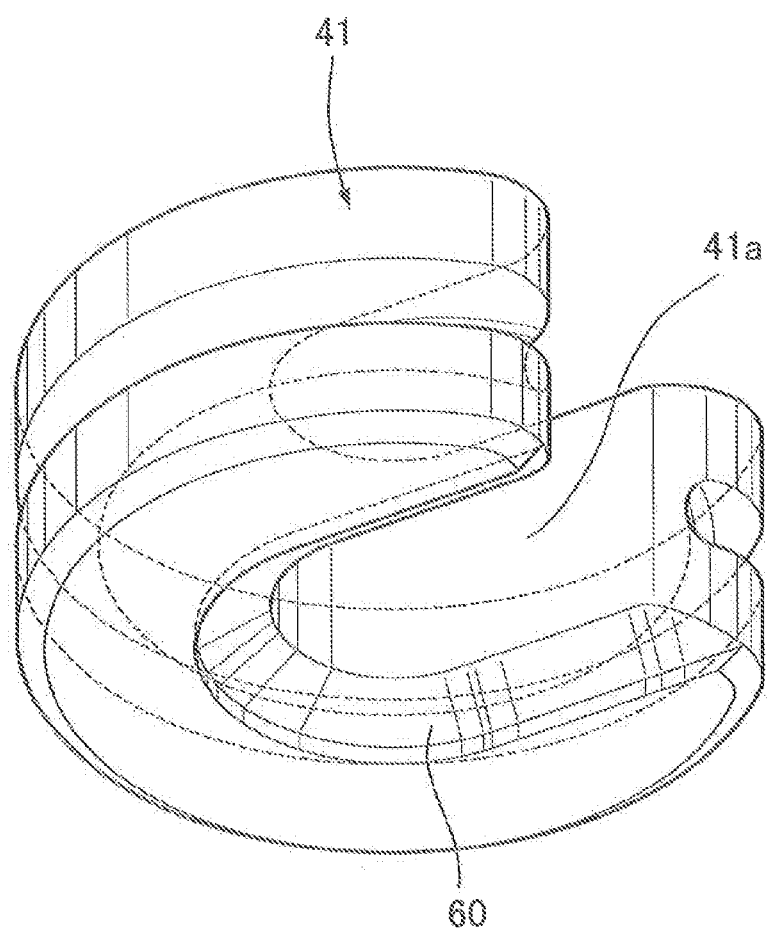
FIG. 3 is a perspective view of a retaining plate in FIG. 2. (first embodiment)

Referring in addition to FIG. 2, the pressure reducing valve 6 has a valve seat member 26 that is formed into a ring shape while having on the inner periphery a pressure reducing valve seat 25 having a valve hole 24 opening in a central part, the valve hole 24 communicating with the pressure reducing chamber 18, and that is fixedly disposed within the fitting hole portion 15b of the housing hole 15, a valve shaft 27 loosely extending inwardly of the second inwardly-facing collar portion 13b and the valve hole 24, and the pressure reducing valve body 10, made of a synthetic resin, fitted around the outer periphery of the valve shaft 27 so as to be capable of being seated on the pressure reducing valve seat 25.

A housing 28 is inserted into and fixed to the interior of the fitting hole portion 15b of the housing hole 15, the housing 28 integrally having a bowl-shaped retaining portion 28a opening toward the second inwardly-facing collar portion 13b side, a large diameter cylindrical portion 28b coaxially connected to a central part of the retaining portion 28a and extending toward the side opposite to the second inwardly-facing collar portion 13b, a small diameter cylindrical portion 28c formed so as to have a smaller diameter than that of the large diameter cylindrical portion 28b and coaxially connected to the large diameter cylindrical portion 28b, and an end wall portion 28d closing an end part, on the side opposite to the second inwardly-facing collar portion 13b, of the small diameter cylindrical portion 28c. The valve seat member 26 is press fitted and fixed to the retaining portion 28a of the housing 28. An annular third seal member 29, coaxial with the valve hole 24, is fitted into a face, opposing the second inwardly-facing collar portion 13b, of the valve seat member 26, and an annular fourth seal member 30, coaxial with the third seal member 29, is fitted into a face, opposing the housing 28, of the valve seat member 26.

A valve chamber 31 is formed within the housing 28, the valve chamber 31 housing the pressure reducing valve body 10, the pressure reducing valve seat 25 is formed into a tapered shape at the inner peripheral edge of the valve seat member 26 so as to face the valve chamber 31, and a section, that is seated on the pressure reducing valve seat 25, of the pressure reducing valve body 10 is also formed into a tapered shape.

The pressure reducing valve body 10 is slidably supported by the large diameter cylindrical portion 28b and the small diameter cylindrical portion 28c of the housing 28, and an annular fifth seal member 32 is disposed between the large diameter cylindrical portion 28b and the pressure reducing valve body 10, the fifth seal member 32 being in sliding contact with the outer periphery of the pressure reducing valve body 10 and guiding movement of the pressure reducing valve body 10. Furthermore, a first back up ring 33 is disposed between the fifth seal member 32 and a step portion between the large diameter cylindrical portion 28b and the small diameter cylindrical portion 28c, and a basket-shaped support member 34 is sandwiched between the large diameter cylindrical portion 28b and the valve seat member 26, the support member 34 sandwiching the fifth seal member 32 between itself and the first back up ring 33.

The pressure reducing valve body 10 can be moved between a valve-opened position in which the pressure reducing valve body 10 is detached upwardly from the pressure reducing valve seat 25 (a state shown by the solid line in FIG. 2) and a valve-closed position in which the pressure reducing valve body 10 is seated on the pressure reducing valve seat 25 (a state shown by the chain line in FIG. 2). A back pressure chamber 35 is formed between the small diameter cylindrical portion 28c and end wall portion 28d of the housing 28, the valve shaft 27, and the pressure reducing valve body 10 so that the fifth seal member 32 provides sealing between the back pressure chamber 35 and the valve chamber 31, and the back pressure chamber 35 communicates with the pressure reducing chamber 18 via a through passage 36 provided in the valve shaft 27.

A diaphragm rod 38 is slidably fitted into the sliding support hole 14 formed within the short tube portion 12d of a central part of the first body member 12, the diaphragm rod 38 having on the outer periphery an annular sixth seal member 37 that is in resilient sliding contact with the inner periphery of the sliding support hole 14.

A bottomed linking hole 40 opening toward the pressure reducing valve body 10 side is coaxially provided in the diaphragm rod 38. This linking hole 40 is formed from a bottomed cylindrical spring seat hole 40a, a spring guide hole 40b increasing in diameter in a tapered shape outwardly from the outer end of the spring seat hole 40a, a fitting hole 40c coaxially connected to the outer end of the spring guide hole 40b, and a ring guide hole 40d increasing in diameter in a tapered shape outwardly from the outer end of the fitting hole 40c and opening on an extremity face of the diaphragm rod 38.

On the other hand, provided on an end part of the valve shaft 27 extending through the valve hole 24 toward the diaphragm rod 38 side are a decreased diameter shaft portion 27a and first and second increased diameter shaft portions 27b and 27c having a larger diameter than that of the decreased diameter shaft portion 27a and disposed on opposite sides in the axial direction thereof. The first increased diameter shaft portion 27b is disposed on the pressure reducing valve body 10 side and the second increased diameter shaft portion 27c is disposed on the diaphragm rod 38 side.

A retaining plate 41 (see FIG. 3) is mounted on the decreased diameter shaft portion 27a. This retaining plate 41 is formed so as to have a U-shaped cross section while having a latching recess portion 41a opening on one side, the latching recess portion 41a having a width that is larger than the external diameter of the decreased diameter shaft portion 27a and smaller than the external diameter of the two increased diameter shaft portions 27b and 27c. The retaining plate 41 is mounted on the decreased diameter shaft portion 27a so that it does not move relative thereto in the axial direction by loosely inserting the decreased diameter shaft portion 27a into the latching recess portion 41a, and is slidably fitted into the fitting hole 40c of the diaphragm rod 38.

An arc-shaped first latching groove 42 is provided on the outer periphery of the retaining plate 41, an annular second latching groove 43 is provided on the inner periphery of the fitting hole 40c, the annular second latching groove 43 being provided so as to correspond to the first latching groove 42, and a latching ring 44 engages with the first and second latching grooves 42 and 43, the latching ring 44 being capable of increasing and decreasing along the radial direction of the valve shaft 27. The latching ring 44 is a substantially C-shaped resilient ring having a gap at one end.

A set spring 58 is provided in a compressed state between the retaining plate 41 and the bottom of the spring seat hole 40a of the diaphragm rod 38, the set spring 58 urging the retaining plate 41 toward the valve-opening side of the pressure reducing valve body 10. As a result, a state in which the latching ring 44 and an inside face, on the set spring 58 side, of the first latching groove 42 abut against each other, and the latching ring 44 and an inside face, on the pressure reducing valve body 10 side, of the second latching groove 43 abut against each other is maintained.

Furthermore, one of axially opposing end faces of the second increased diameter shaft portion 27c and the retaining plate 41 is formed into a convex spherical face 59 and the other end face is formed into a concave tapered face 60, and the spherical face 59 and the tapered face 60 can abut against each other in a swivelable manner. In the illustrated example, the spherical face 59 is provided on the second increased diameter shaft portion 27c side, and the tapered face 60 is provided on the retaining plate 41 side.

The linking hole 40, the decreased diameter shaft portion 27a, the first and second increased diameter shaft portions 27b and 27c, the retaining plate 41, the latching ring 44, the first and second latching grooves 42 and 43, and the set spring 58 form a linking mechanism 39 linking the diaphragm rod 38 and the valve shaft 27 in the axial direction.

When assembling this linking mechanism 39, the set spring 58 is first dropped into the linking hole 40 of the diaphragm rod 38. One end part of the set spring 58 is guided by the spring guide hole 40b and automatically received and positioned in the spring seat hole 40a, thus enabling the set spring 58 to be automatically disposed at a predetermined position.

Subsequently, the latching recess portion 41a of the retaining plate 41 is engaged with the decreased diameter shaft portion 27a of the valve shaft 27 from the side, and the latching ring 44 is fitted into the first latching groove 42 of the retaining plate 41. In this process, the latching ring 44 is in a free state in which the outer peripheral side thereof protrudes a long way from the first latching groove 42. Subsequently, when the retaining plate 41 is fitted into the fitting hole 40c of the diaphragm rod 38 together with the valve shaft 27 while compressing the set spring 58, the latching ring 44 is guided by the tapered ring guide hole 40d while being decreased in diameter and reaches the second latching groove 43 through the fitting hole 40c, and it then increases in diameter by virtue of its self resilient force until it abuts against the groove bottom of the second latching groove 43, the inner peripheral side thereof being maintained in a state in which it is engaged with the first latching groove 42.

In this way, one simple operation of pushing the retaining plate 41 into the fitting hole 40c along the axial direction enables the latching ring 44 to be simultaneously engaged with the first and second latching grooves 42 and 43, thus linking the retaining plate 41 linked to the valve shaft 27 to the diaphragm rod 38 in the axial direction. Moreover, by disposing the set spring 58 a state in which the inside face, on the set spring 58 side, of the first latching groove 42 and the latching ring 44 abut against each other and a state in which the latching ring 44 and the inside face, on the pressure reducing valve body 10 side, of the second latching groove 43 abut against each other are maintained.

Referring again to FIG. 1, a diaphragm cover 45 formed into a bottomed cylindrical shape having an end wall 45a on the side opposite to the first body member 12 is secured to the first body member 12 on the side opposite to the second body member 13 so as to sandwich the peripheral edge of the diaphragm 8 between the diaphragm cover 45 and the first body member 12, and the diaphragm rod 38 is linked to a central part of the diaphragm 8. That is, the diaphragm rod 38 coaxially and integrally has a shaft portion 38a extending toward the side opposite to the opening direction of the linking hole 40, this shaft portion 38a is inserted through a ring-shaped first retainer 46 sandwiched between the diaphragm rod 38 and the central part of the diaphragm 8, and a ring-shaped second retainer 47 sandwiching the central part of the diaphragm 8 between itself and the first retainer 46, and the central part of the diaphragm 8 is linked to the shaft portion 38a by swaging part of the outer periphery of the shaft portion 38a in a section projecting from the second retainer 47 and engaging it with the second retainer 47. Furthermore, an annular seventh seal member 48 is disposed between the diaphragm rod 38 and the first retainer 46.

A pressure action chamber 49 is thus formed between the diaphragm 8 and the first body member 12, one side of the diaphragm 8 facing the pressure action chamber 49, a control pressure chamber 50 is formed between the diaphragm 8 and the diaphragm cover 45, the other side of the diaphragm 8 facing the control pressure chamber 50, and a through passage 51 is provided in the first body member 12, the through passage 51 providing communication between the pressure action chamber 49 and the outlet passage 19 communicating with the pressure reducing chamber 18. Moreover, a coil-shaped diaphragm spring 52 housed in the control pressure chamber 50 is provided in a compressed state between the diaphragm cover 45 and the diaphragm 8. Furthermore, a negative pressure introduction pipe 53 communicating with the control pressure chamber 50 is connected to the diaphragm cover 45, this negative pressure introduction pipe 53 being connected to the engine and introducing engine intake negative pressure to the control pressure chamber 50.

A support tube 54 projecting toward the control pressure chamber 50 side is provided integrally with a central part of the end wall 45a of the diaphragm cover 45, an adjusting screw 55 capable of being rotated from outside the diaphragm cover 45 is screwed into the support tube 54 so that one end thereof projects into the control pressure chamber 50, and an annular eighth seal member 56 is disposed between the support tube 54 and the adjusting screw 55. Furthermore, the control pressure chamber 50 houses a bottomed cylindrical spring seat member 57 covering the support tube 54 while one end part of the adjusting screw 55 abuts against a central part of a blocked end thereof, and the diaphragm spring 52 is provided in a compressed state between the spring seat member 57 and the second retainer 47 fixed to the central part of the diaphragm 8. The spring seat member 57 can thus be moved forward and backward by rotating the adjusting screw 55, thereby adjusting the spring load of the diaphragm spring 52.

In such a pressure reducing valve 6, when the diaphragm 8 flexes toward the control pressure chamber 50 side against the spring force of the diaphragm spring 52 by virtue of the pressure of the pressure action chamber 49, that is, the pressure of the pressure reducing chamber 18, the diaphragm rod 38 pulls the valve shaft 27 via the retaining plate 41, and the pressure reducing valve body 10 is seated on the pressure reducing valve seat 25 to thus close the valve; when the diaphragm 8 flexes toward the pressure action chamber 49 side as a result of the pressure of the pressure action chamber 49 decreasing, the diaphragm rod 38 pushes the valve shaft 27 via the retaining plate 41, and the pressure reducing valve body 10 is detached from the pressure reducing valve seat 25 to thus open the valve. By repeating such seating of the pressure reducing valve body 10 on the pressure reducing valve seat 25 and detachment therefrom, high pressure gaseous fuel from the valve chamber 31 is decreased in pressure and guided to the pressure reducing chamber 18.

As described above, the set spring 58 is provided in a compressed state in the linking hole 40 of the diaphragm rod 38, the set spring 58 urging the retaining plate 41 toward the valve-opening side of the pressure reducing valve body 10, and this maintains a state in which the inside face, on the set spring 58 side, of the first latching groove 42 of the retaining plate 41 and the latching ring 44 abut against each other and a state in which the latching ring 44 and the inside face, on the pressure reducing valve body 10 side, of the second latching groove 43 of the diaphragm rod 38 abut against each other. Because of this, when the diaphragm 8 pushes or pulls the valve shaft 27, the abutting state can be maintained, and it is therefore possible to prevent the phenomenon of repeated detachment and abutment of the abutment part, which causes an abnormal noise. Moreover, since there is no delay in response of the pressure reducing valve body 10 to movement of the diaphragm 8, it can also contribute to improvement of the pressure regulating performance.

Furthermore, since a minute gap is present in the radial direction between the decreased diameter shaft portion 27a of the valve shaft 27 and the latching recess portion of the retaining plate 41, any error in the coaxial precision between the valve shaft 27 and the diaphragm rod 38 can be absorbed by the minute gap, thus ensuring an appropriate valve-closed state of the pressure reducing valve body 10.

Furthermore, in the valve-closed state of the pressure reducing valve body 10, opposing faces of the second increased diameter shaft portion 27c and the retaining plate 41 are made to abut against each other by virtue of the pulling force of the diaphragm rod 38, and as described above since one of the opposing faces is formed as the convex spherical face 59, and the other is formed as the concave tapered face 60, due to a swiveling operation of the spherical face 59 and the tapered face 60 relative to each other, any tilt of the diaphragm rod 38 relative to the valve shaft 27 can also be absorbed, thus contributing to an appropriate valve-closing of the pressure reducing valve body 10.

The solenoid 9 of the cutoff valve 7 includes a bobbin 62 molded from a synthetic resin so as to have a center hole 61, a coil 63 wound around the bobbin 62, a synthetic resin cover part 64 covering the bobbin 62 and the coil 63, a guide tube 65 made of a non-magnetic material having one end part fixedly inserted into the housing hole 15 of the second body member 13 of the body 5 and having the other end part inserted into one end side of the center hole 61 of the bobbin 62, a fixed core 66 coaxially fixed to the guide tube 65 while blocking the other end of the guide tube 65, a solenoid housing 67 made of a magnetic material formed into a bottomed cylindrical shape so that one end is open and the other end is closed by an end wall portion 67a and covering the bobbin 62, the coil 63, and the cover part 64, a holder 68 closing an opening part at one end of the solenoid housing 67 while integrally having a cylindrical portion 68a having cut on the outer periphery a male thread that is screwed into the threaded hole portion 15a of the housing hole 15 of the second body member 13, a movable core 69 opposing the fixed core 66 and slidably fitted into the guide tube 65, and a return spring 70 provided in a compressed state between the fixed core 66 and the movable core 69.

A cylindrical portion 67b is provided integrally with the end wall portion 67a of the solenoid housing 67, the cylindrical portion 67b being fitted into the other end side of the center hole 61 of the bobbin 62, and a bolt 72 inserted through a central part of the end wall portion 67a is screwed into the fixed core 66 fitted into the cylindrical portion 67b. Furthermore, a coupler portion 64a projecting outwardly from the solenoid housing 67 is formed integrally with the cover part 64.

The guide tube 65 is fixed to the second body member 13 while integrally having a small diameter portion 65a having one end part coaxially inserted into the threaded hole portion 15a of the housing hole 15 of the second body member 13 and the other end part fitted into one end side of the center hole 61 of the bobbin 62, and a large diameter portion 65b formed so as to have a larger diameter than that of the small diameter portion 65a and coaxially connected to one end of the small diameter portion 65a so as to be fitted into the fitting hole portion 15b of the housing hole 15.

Formed in the guide tube 65 so as to be coaxially connected in an intermediate section in the axial direction of the large diameter portion 65b are a small diameter hole 74 having one end part of the fixed core 66 fitted thereinto and having the movable core 69 coaxially inserted thereinto, and a large diameter hole 75 formed so as to have a larger diameter than that of the small diameter hole 74 and opening at one end of the large diameter portion 65b.

Moreover, one end of the large diameter portion 65b abuts against the retaining portion 28a of the housing 28 from the side opposite to the second inwardly-facing collar portion 13b, the guide tube 65 is fixed to the second body member 13 so as to sandwich the housing 28 between itself and the second inwardly-facing collar portion 13b, and a second back up ring 77 and an annular ninth seal member 76 in resilient contact with the inner periphery of the fitting hole portion 15b are fitted onto the outer periphery of the large diameter portion 65b.

Furthermore, an annular step portion 65c is formed on the guide tube 65 so as to face the side opposite to the second inwardly-facing collar portion 13b in a section where the small diameter portion 65a and the large diameter portion 65b are connectedly provided, and one end of the cylindrical portion 68a of the holder 68 screwed into the threaded hole portion 15a of the housing hole 15 abuts against the step portion 65c. Therefore, the holder 68 is screwed into the threaded hole portion 15a in an end part, on the side opposite to the diaphragm 8, of the housing hole 15 so as to sandwich the large diameter portion 65b of the guide tube 65 and the retaining portion 28a of the housing 28 between itself and the second inwardly-facing collar portion 13b.

By screwing and tightening the bolt 72 into the fixed core 66 at the other end part of the guide tube 65 fixed to the second body member 13 of the body 5, the holder 68 fixed to the second body member 13 of the body 5 is made to abut against the opening part at one end of the solenoid housing 67 covering the bobbin 62, the coil 63, and the cover part 64, and the solenoid housing 67 and the holder 68 form a magnetic path for magnetic flux generated when current is passed through the coil 63.

The cutoff valve 7 includes the cutoff valve body 78 and an auxiliary valve body 79 assembled to the cutoff valve body 78 so that it can move relative to the cutoff valve body 78 within a predetermined range, the auxiliary valve body 79 being formed in an end part, on the side opposite to the fixed core 66, of the movable core 69. Furthermore, the cutoff valve body 78 is inserted into the fitting hole portion 15b of the housing hole 15 of the second body member 13 from the side opposite to the diaphragm 8, and the pressure reducing valve body 10 of the pressure reducing valve 6 is coaxially housed within the cutoff valve body 78.

The cutoff valve body 78 is formed into a bottomed cylindrical shape while integrally having a stepped cylindrical portion 78a coaxially covering the large diameter cylindrical portion 28b and the small diameter cylindrical portion 28c of the housing 28, a collar portion 78b protruding radially outwardly from one end of the stepped cylindrical portion 78a and opposing the retaining portion 28a of the housing 28 from the side opposite to the second inwardly-facing collar portion 13b, and an end wall portion 78c having in a central part a pilot port 80 coaxial with the central axis of the stepped cylindrical portion 78a and closing the other end part of the stepped cylindrical portion 78a, and a projecting portion 78d forming part of the pilot port 80 is projectingly provided integrally with an outer face of a central part of the end wall portion 78c of the cutoff valve body 78 so as to face toward the fixed core 66 side. The stepped cylindrical portion 78a of the cutoff valve body 78 is coaxially inserted into the small diameter hole 74 of the guide tube 65, and the collar portion 78b is coaxially disposed within the large diameter hole 75 of the guide tube 65.

An annular first rubber seal 81 is embedded in the collar portion 78b of the cutoff valve body 78 so as to oppose a face, on the side opposite to the second inwardly-facing collar portion 13b, of the retaining portion 28a of the housing 28, and a cutoff valve seat 82 is formed on another member that is separate from the second body member 13 of the body 5 and that is fixed to the second body member, that is, the housing 28 in the illustrated example, the first rubber seal 81 being capable of being seated on the cutoff valve seat 82, and the cutoff valve seat 82 is formed on the retaining portion 28a of the housing 28 so as to project in an annular manner for the first rubber seal 81 to be seated thereon.

An annular recess part 83 is provided on the outer periphery of the large diameter portion 65b of the guide tube 65 between the ninth seal member 76 and the retaining portion 28a of the housing 28, an inlet passage 84 communicating with the annular recess part 83 is provided in the second body member 13, and a connecting member 85 is mounted on a side face of the second body member 13, the connecting member 85 having connected thereto a pipe for guiding high pressure gaseous fuel and making it communicate with the inlet passage 84.

A plurality of first communication holes 86 providing communication between the annular recess part 83 and the large diameter hole 75 are provided in a large diameter part of the guide tube 65, and a plurality of second communication holes 87 communicating with the valve chamber 31 of the pressure reducing valve 6 are provided in the large diameter cylindrical portion 28b of the housing 28. The inlet passage 84, the annular recess part 83, the first communication holes 86, and the second communication holes 87 form a high pressure passage 88 for guiding high pressure gaseous fuel toward the pressure reducing valve 6 side, and the cutoff valve body 78 and the cutoff valve seat 82 of the cutoff valve 7 are disposed between the first and second communication holes 86, 87 partway along the high pressure passage 88.

A recess part 90 coaxial with the central axis of the cutoff valve body 78 and the auxiliary valve body 79 is provided in one of the cutoff valve body 78 and the auxiliary valve body 79, that is, the auxiliary valve body 79 in the illustrated example, an insert part 91 inserted into the recess part 90 is provided on the other of the cutoff valve body 78 and the auxiliary valve body 79, that is, the cutoff valve body 78 in this embodiment, and part of the stepped cylindrical portion 78a and the end wall portion 78c of the cutoff valve body 78 are inserted into the recess part 90 as the insert part 91. A pilot valve chamber 92 is formed between the auxiliary valve body 79 and the cutoff valve body 78, a first passage 93 providing communication between the pilot valve chamber 92 and the first communication holes 86 communicating with the inlet passage 84 via the annular recess part 83 is formed between the guide tube 65 and the cutoff valve body 78, and a second passage 94 providing communication between the pilot port 80 and the second communication holes 87 communicating with the valve chamber 31 is formed between the housing 28 and the cutoff valve body 78.

A second rubber seal 95 is embedded in the auxiliary valve body 79 so as to be positioned in a central part of the blocked end of the recess part 90, and the movable core 69, that is, the auxiliary valve body 79, operates so as to switch according to non-energization and energization of the solenoid 9 between a state in which the second rubber seal 95 abuts against the projecting portion 78d of the insert part 91 of the cutoff valve body 78 so as to close the pilot port 80 (the state of FIG. 1) and a state in which the second rubber seal 95 is detached from the projecting portion 78d so as to open the pilot port 80.

A C-shaped ring 98 that can undergo elastic deformation so as to increase and decrease in diameter according to application of an external force is fitted in an annular groove 97 provided on one of the inner periphery of the recess part 90 and the outer periphery of the insert part 91, that is, the outer periphery of the insert part 91 in this embodiment, so that part of the C-shaped ring 98 projects outwardly from the annular groove 97 when no external force is applied thereto. Furthermore, an engagement projection 99 is projectingly provided on the other of the inner periphery of the recess part 90 and the outer periphery of the insert part 91, that is, the inner periphery at the open end of the recess part 90 in the illustrated example, so as to project radially inwardly, the engagement projection 99 applying an external force to the ring 98 so that it climbs over the ring 98 when the cutoff valve body 78 and the auxiliary valve body 79 are assembled to each other by inserting the insert part 91 into the recess part 90.

Moreover, with regard to setting of the relative position of the ring 98 and the engagement projection 99 in a state in which the cutoff valve body 78 and the auxiliary valve body 79 are assembled to each other, in a state in which as shown in FIG. 1 the solenoid 9 is in a non-energized state and the auxiliary valve body 79 in a non-operated state closes the pilot port 80, a gap along the direction of movement of the cutoff valve body 78 and the auxiliary valve body 79 is formed between the ring 98 and the engagement projection 99, but when the solenoid 9 is in an energized state and the auxiliary valve body 79 moves toward the side on which the pilot port 80 is opened, after the pilot port 80 is opened, the engagement projection 99 engages with the ring 98 so as to move the cutoff valve body 78 toward the valve-opening position.

Moreover, a taper portion 99a is formed on the engagement projection 99, the taper portion 99a applying to the C-shaped ring 98 an external force in the direction in which it is housed in the annular groove 97 in response to forward movement of the insert part 91 when the insert part 91 is inserted into the recess part 90 in order to assemble the cutoff valve body 78 and the auxiliary valve body 79 to each other.

In such a cutoff valve 7, due to non-energization of the coil 63 when the engine is stopped, the movable core 69 moves in the direction in which it moves away from the fixed core 66 due to the spring force of the return spring 70; as shown in FIG. 2, the first rubber seal 81 of the cutoff valve body 78 is seated on the cutoff valve seat 82 so as to cut off communication between the first and second communication holes 86, 87, and the second rubber seal 95 of the auxiliary valve body 79 abuts against projecting portion 78d to thus close the pilot port 80, thereby cutting off communication between the pilot valve chamber 92 and the second passage 94 and stopping the supply of high pressure gaseous fuel toward the valve chamber 31 side.

On the other hand, when the coil 63 is energized at the time of starting running of the engine, the movable core 69 first moves toward the fixed core 66 side by a portion that makes the second rubber seal 95 of the auxiliary valve body 79 detach from the projecting portion 78d forming the pilot port 80, and the second passage 94 communicating with the valve chamber 31 via the second communication holes 87 is made to communicate with the pilot valve chamber 92 via the pilot port 80. This allows high pressure gaseous fuel to gradually flow from the inlet passage 84 to the pilot port 80 through the annular recess part 83, the first communication holes 86, the first passage 93, and the pilot valve chamber 92. As a result, the difference in pressure acting on opposite sides of the cutoff valve body 78 becomes small.

When the driving force of the solenoid 9 overcomes the force in the valve-closing direction based on the differential pressure acting on the cutoff valve body 78, by engaging the engagement projection 99 with the ring 98 the auxiliary valve body 79 linked to the cutoff valve body 78, that is, the movable core 69, moves further toward the fixed core 66 side, the first rubber seal 81 of the cutoff valve body 78 is detached from the cutoff valve seat 82, and gaseous fuel flows from the high pressure passage 88 toward the valve chamber 31 side.

Figure 4:
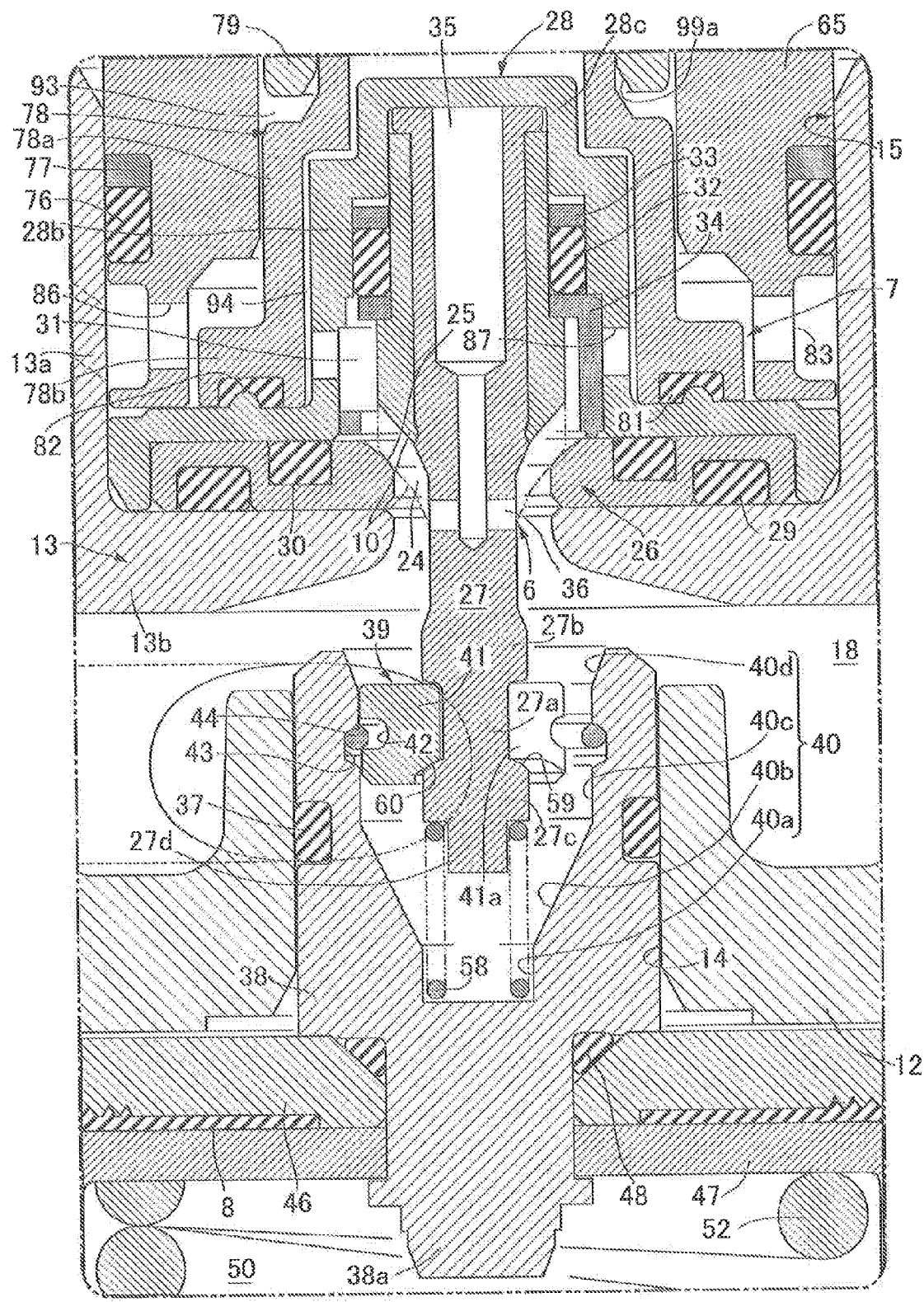
FIG. 4 is a view, corresponding to FIG. 2, of a second embodiment of the present invention. (second embodiment)

A second embodiment of the present invention shown in FIG. 4 is now explained.
Second Embodiment In this second embodiment, in a linking mechanism 39 linking a diaphragm rod 38 and a valve shaft 27 to each other, a short shaft portion 27d is coaxially and connectedly provided at the outer end of a second increased diameter shaft portion 27c of the valve shaft 27, the short shaft portion 27d having a smaller diameter than that of the second increased diameter shaft portion 27c, whereas a spring seat hole 40a of a linking hole 40 of the diaphragm rod 38 is formed so as to have substantially the same diameter as that of the second increased diameter shaft portion 27c of the valve shaft 27, one end part of a set spring 58 in a compressed state is received and positioned by the spring seat hole 40a, and the other end part thereof is supported by the outer end of the second increased diameter shaft portion 27c connected to the short shaft portion 27d while being fitted around the outer periphery of the short shaft portion 27d. As a result, the set spring 58 urges a retaining plate 41 toward the valve-opening side of a pressure reducing valve body 10 via the valve shaft 27. The arrangement is otherwise the same as that of the preceding embodiment; in FIG. 4 portions corresponding to those of the preceding embodiment are denoted by the same reference numerals and symbols, and duplication of the explanation is omitted.

In accordance with this second embodiment, opposing faces of the retaining plate 41 and the increased diameter shaft portion on a diaphragm 8 side, that is, a spherical face 59 and a tapered face 60, can be always maintained in an abutting state by virtue of the urging force of the set spring 58 and, moreover, in the same manner as in the embodiment an inside face, on the set spring 58 side, of a first latching groove 42 of the retaining plate 41 and the latching ring 44, and a latching ring 44 and an inside face, on the pressure reducing valve body 10 side, of a second latching groove 43 of the diaphragm rod 38 are each always maintained in an abutting state, and it is possible to further reliably prevent the occurrence of an abnormal noise due to rattling in a linking mechanism 39 regardless of whether the diaphragm rod 38 is pushing or pulling, thereby ensuring an appropriate valve-closed attitude of the pressure reducing valve body 10.

Embodiments of the present invention are explained above, but the present invention is not limited to the embodiments above and may be modified in a variety of ways as long as the modifications do not depart from the spirit and scope thereof.

The invention claimed is:

1. A pressure reducing valve comprising a valve seat member that has a valve hole providing communication between a high pressure chamber and a pressure reducing chamber, a pressure reducing valve body that opens and closes the valve hole in cooperation with the valve seat member, a diaphragm rod that is linked via a linking mechanism to a valve shaft connectedly provided at one end of the pressure reducing valve body, and a diaphragm that is joined to the diaphragm rod and disposed so as to provide a partition between a control pressure chamber and a pressure action chamber, the pressure action chamber being made to communicate with the pressure reducing chamber, the diaphragm pulling the valve shaft so as to seat the pressure reducing valve body on the valve seat member when shifting to the control pressure chamber side, the diaphragm pushing the valve shaft so as to separate the pressure reducing valve body from the valve seat member when shifting to the pressure action chamber side, the linking mechanism being formed from a bottomed linking hole that is provided in the diaphragm rod and opens on the valve seat member side, a decreased diameter shaft portion provided on the valve shaft and first and second increased diameter shaft portions disposed on opposite sides in the axial direction of the decreased diameter shaft portion and having a larger diameter than that of the decreased diameter shaft portion, a retaining plate that is fitted into the linking hole and has a latching recess portion opening on one side and having a width that is larger than an external diameter of the decreased diameter shaft portion and smaller than an external diameter of the two increased diameter shaft portions, the decreased diameter shaft portion being loosely inserted into the latching recess portion, and a latching ring that engages with an arc-shaped first latching groove provided on an outer peripheral face of the retaining plate and an annular second latching groove provided on an inner periphery of the linking hole so as to correspond to the first latching groove, the latching ring being capable of increasing in diameter along a radial direction of the valve shaft, wherein a set spring is provided in a compressed state in the linking hole, the set spring urging the retaining plate toward the side on which the pressure reducing valve body is opened.

2. A pressure reducing valve comprising a valve seat member that has a valve hole providing communication between a high pressure chamber and a pressure reducing chamber, a pressure reducing valve body that opens and closes the valve hole in cooperation with the valve seat member, a diaphragm rod that is linked via a linking mechanism to a valve shaft connectedly provided integrally at one end of the pressure reducing valve body, and a diaphragm that is joined to the diaphragm rod and disposed so as to provide a partition between a control pressure chamber and a pressure action chamber, the pressure action chamber being made to communicate with the pressure reducing chamber, the diaphragm dragging the valve shaft so as to seat the pressure reducing valve body on the valve seat member when shifting to the control pressure chamber side, the diaphragm pushing the valve shaft so as to separate the pressure reducing valve body from the valve seat member when shifting to the pressure action chamber side, the linking mechanism being formed from a bottomed linking hole that is provided in the diaphragm rod and opens on the valve seat member side, a decreased diameter shaft portion provided on the valve shaft and first and second increased diameter shaft portions disposed on opposite sides in an axial direction of the decreased diameter shaft portion and having a larger diameter than that of the decreased diameter shaft portion, a retaining plate that is fitted into the linking hole and has a latching recess portion opening on one side and having a width that is larger than an external diameter of the decreased diameter shaft portion and smaller than an external diameter of the two increased diameter shaft portions, the decreased diameter shaft portion being loosely inserted into the latching recess portion, and a latching ring that engages with an arc-shaped first latching groove provided on an outer peripheral face of the retaining plate and an annular second latching groove provided on an inner periphery of the linking hole so as to correspond to the first latching groove, the latching ring being capable of increasing in diameter along a radial direction of the valve shaft, wherein a set spring is provided in a compressed state in the linking hole, the set spring urging the valve shaft toward the side on which the pressure reducing valve body is opened.

3. The pressure reducing valve according to claim 1, wherein one of mutually abutting end faces of the retaining plate and the second increased diameter shaft portion, on the diaphragm rod side, of the valve shaft is formed into a convex spherical face and the other end face is formed into a concave tapered face.

4. The pressure reducing valve according to claim 1, wherein the linking hole is formed from a spring seat hole that receives and positions an end part of the set spring, a fitting hole that has a larger diameter than that of the spring seat hole and is disposed coaxially therewith, the retaining plate being fitted into the fitting hole, and a spring guide hole that has a tapered shape so as to provide a connection between the spring seat hole and the fitting hole and guides the set spring from the fitting hole to the spring seat hole.

5. The pressure reducing valve according to claim 2, wherein one of mutually abutting end faces of the retaining plate and the second increased diameter shaft portion, on the diaphragm rod side, of the valve shaft is formed into a convex spherical face and the other end face is formed into a concave tapered face.

6. The pressure reducing valve according to claim 2, wherein the linking hole is formed from a spring seat hole that receives and positions an end part of the set spring, a fitting hole that has a larger diameter than that of the spring seat hole and is disposed coaxially therewith, the retaining plate being fitted into the fitting hole, and a spring guide hole that has a tapered shape so as to provide a connection between the spring seat hole and the fitting hole and guides the set spring from the fitting hole to the spring seat hole.

* * * * *